US011308422B2

(12) United States Patent
Neumann

(10) Patent No.: US 11,308,422 B2
(45) Date of Patent: Apr. 19, 2022

(54) METHOD OF AND SYSTEM FOR DETERMINING PHYSICAL TRANSFER INTERCHANGE NODES

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

(*) Notice: Subject to any disclaimer, the term of this patent is extended or adjusted under 35 U.S.C. 154(b) by 0 days.

(21) Appl. No.: 16/983,096

(22) Filed: Aug. 3, 2020

(65) Prior Publication Data
US 2022/0036234 A1 Feb. 3, 2022

(51) Int. Cl.
*G06N 20/00* (2019.01)

(52) U.S. Cl.
CPC .................... *G06N 20/00* (2019.01)

(58) Field of Classification Search
CPC ........................................... G06N 20/00
See application file for complete search history.

(56) References Cited

U.S. PATENT DOCUMENTS

| 8,200,548 | B2 | 6/2012 | Wiedl | |
| 9,494,937 | B2* | 11/2016 | Siegel | G01C 21/20 |
| 9,509,617 | B1* | 11/2016 | Malmgren | H04L 67/10 |
| 10,026,055 | B2 | 7/2018 | Riel-Dalpe et al. | |
| 2002/0004749 | A1 | 1/2002 | Froseth et al. | |
| 2004/0210621 | A1 | 10/2004 | Antonellis | |
| 2010/0280895 | A1 | 11/2010 | Mottola | |
| 2014/0058794 | A1 | 2/2014 | Malov et al. | |

(Continued)

OTHER PUBLICATIONS

Edelkamp et al., "Solving Single Vehicle Pickup and Delivery Problems with Time Windows and Capacity Constraints using Nested Monte-Carlo Search", Proceedings of the 6th International Conference on Agents and Artificial Intelligence (ICAART-2014), pp. 22-33, 2014 (Year: 2014).*

(Continued)

*Primary Examiner* — Tsu-Chang Lee
(74) *Attorney, Agent, or Firm* — Caldwell Intellectual Property Law; Keegan Caldwell; Katherine Rubino

(57) ABSTRACT

A system for determining physical transfer interchange nodes using machine-learning simulation, the system comprising a computing device, wherein the computing device is configured to receive a plurality of alimentary combination identifiers and a plurality of physical transfer apparatus data. Computing device may select an interchange node for the plurality of physical transfer apparatuses, wherein selecting further comprises generating candidate interchange nodes, wherein generating further comprises using an interchange node machine-learning process to generate candidate interchange nodes, each candidate including a location and a time, calculating, using the candidate interchange nodes and the interchange node machine-learning process, a transfer path time for each physical transfer apparatus to each candidate interchange node, and selecting a candidate interchange node that minimizes the transfer time for each the plurality of physical transfer apparatuses. Computing device may display the selected interchange node to a plurality of physical transfer apparatuses.

18 Claims, 8 Drawing Sheets

(56) References Cited

U.S. PATENT DOCUMENTS

| | | |
|---|---|---|
| 2015/0227888 A1 | 8/2015 | Levanon et al. |
| 2016/0372005 A1 | 12/2016 | Bajpai et al. |
| 2017/0024789 A1 | 1/2017 | Frehn et al. |
| 2017/0372197 A1 | 12/2017 | Baughman et al. |
| 2018/0082234 A1* | 3/2018 | Burt .................. G06Q 30/0635 |
| 2018/0293638 A1 | 10/2018 | Simpson |
| 2018/0308066 A1 | 10/2018 | Hadatsuki |
| 2019/0043143 A1 | 2/2019 | Camacho et al. |
| 2020/0065892 A1 | 2/2020 | Brown |
| 2020/0097908 A1* | 3/2020 | Glasfurd ............ G01C 21/3492 |

OTHER PUBLICATIONS https://www.sciencedirect.com/science/article/pii/S0959652620306740.
https://www.semanticscholar.org/paper/The-Meal-Delivery-Routing-Problem-Reyes-Erera/1c0b0f117437f4123cdeb77c24210610733de706.

* cited by examiner

METHOD OF AND SYSTEM FOR DETERMINING PHYSICAL TRANSFER INTERCHANGE NODES

FIELD OF THE INVENTION

The present invention generally relates to the field of machine-learning. In particular, the present invention is directed to a system for determining physical transfer interchange nodes.

BACKGROUND

Efficient path selection using vehicle route guidance is an increasingly vital process for provisioning of alimentary combination identifiers, especially for restaurants and parcel delivery. However, existing methods for path selection using vehicle route guidance suffer from inaccuracy in predictions used to support further computations. Additionally, most strategies neglect the use of determining secondary locations where delivery infrastructure can further optimize the delivery processes.

SUMMARY OF THE DISCLOSURE

In an aspect, a system for determining physical transfer interchange nodes using machine-learning simulation, the system comprising a computing device, wherein the computing device is configured to receive a plurality of alimentary combination identifiers and a plurality of physical transfer apparatus data. Computing device may select an interchange node for a plurality of physical transfer apparatuses, wherein selecting further comprises generating candidate interchange nodes, wherein generating candidate interchange nodes further comprises using an interchange node machine-learning process to generate candidate interchange nodes, each candidate location including a location and a node time, for a plurality of physical transfer apparatuses based on alimentary combination identifier terminal points and current physical transfer apparatus locations, calculating, using the candidate interchange nodes and the interchange node machine-learning process, a transfer path time for each physical transfer apparatus of the plurality of physical transfer apparatuses to each candidate interchange node, and selecting a candidate interchange node that minimizes the transfer time for each the plurality of physical transfer apparatuses. Computing device may display the selected interchange node to a plurality of physical transfer apparatuses.

In another aspect, a method for determining physical transfer interchange nodes using machine-learning simulation, the system comprising a computing device, wherein the computing device is configured to receive a plurality of alimentary combination identifiers and a plurality of physical transfer apparatus data. Computing device may select an interchange node for a plurality of physical transfer apparatuses, wherein selecting further comprises generating candidate interchange nodes, wherein generating candidate interchange nodes further comprises using an interchange node machine-learning process to generate candidate interchange nodes, each candidate location including a location and a node time, for a plurality of physical transfer apparatuses based on alimentary combination identifier terminal points and current physical transfer apparatus locations, calculating, using the candidate interchange nodes and the interchange node machine-learning process, a transfer path time for each physical transfer apparatus of the plurality of physical transfer apparatuses to each candidate interchange node, and selecting a candidate interchange node that minimizes the transfer time for each the plurality of physical transfer apparatuses. Computing device may display the selected interchange node to a plurality of physical transfer apparatuses.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for determining physical transfer interchange nodes. Embodiments described in this disclosure establish candidate interchange nodes for alimentary combination identifiers based on Monte Carlo simulation for selecting candidate interchange nodes. For each candidate location, a machine-learning process may calculate the times necessary for a plurality of physical transfer apparatuses to convene at an interchange node, and which alimentary combination identifiers would be taken from the interchange node to be delivered along a path. Candidate locations that result in minimized average path times for all physical transfer apparatuses are selected by the machine-learning process, with the associated paths saved for the physical transfer apparatuses to retrieve from a database. Embodiments may be used to generate real-time, efficient pairing of physical transfer apparatuses with interchange nodes and then pair physical transfer apparatuses with items to take from the interchange node.

Figure 1:
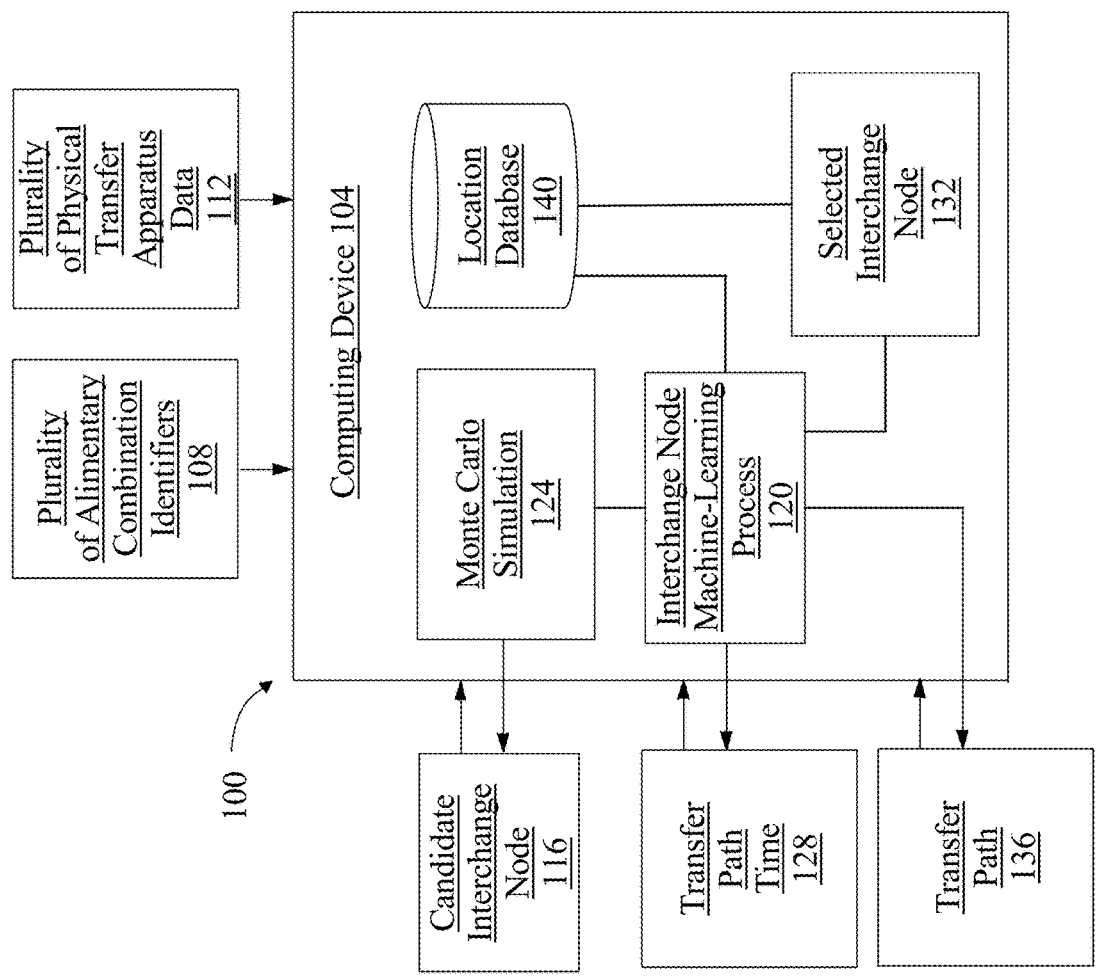
FIG. 1 is a block diagram of an exemplary embodiment of a system for determining physical transfer interchange nodes.

Referring now to FIG. 1, an exemplary embodiment of a system 100 for determining physical transfer interchange nodes is illustrated. System includes a computing device 104. computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 104 may include but is not limited to, for example, a computing device or cluster of computing devices in a first location and a second computing device or cluster of computing devices in a second location. computing device 104 may include one or more computing devices dedicated to data storage, security, distribution of traffic for load balancing, and the like. computing device 104 may distribute one or more computing tasks as described below across a plurality of computing devices of computing device 104, which may operate in parallel, in series, redundantly, or in any other manner used for distribution of tasks or memory between computing devices. computing device 104 may be implemented using a "shared nothing" architecture in which data is cached at the worker, in an embodiment, this may enable scalability of system 100 and/or computing device.

Computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon examination of the entirety of this disclosure, will be aware of various ways in which steps, sequences of steps, processing tasks, and/or data may be subdivided, shared, or otherwise dealt with using iteration, recursion, and/or parallel processing.

Continuing in reference to FIG. 1, computing device 104 may receive a plurality of alimentary combination identifiers 108 and a plurality of physical transfer apparatus data 112. The plurality of alimentary combination identifiers 108 may include the identity of the plurality of alimentary elements of the plurality of alimentary combination identifiers 108 and the destination geolocation of the plurality of alimentary combination identifiers 108. The plurality of alimentary elements may refer to meals, food items, groceries, and the like. The plurality of alimentary elements may be matched to an order, with a single order containing one or more alimentary elements. An order, of a plurality of alimentary combination identifiers 108, may have a destination geolocation associated with the order information. A destination geolocation may be an address, global positioning system (GPS) coordinates, or the like, that may be identified as a geographical location. The plurality of physical transfer apparatus data 112 may include physical transfer apparatus location data. The plurality of physical transfer apparatuses may refer to at least two apparatuses used for physical handling and transferring alimentary elements, for instance and without limitation, vehicles, trucks, trains, planes, drones, and the like, that may be guided by personnel and/or autonomously. Regardless of mode of physical transfer, at least an apparatus as used herein, may be guided by geolocation data to physically transfer an alimentary element to a geolocation destination. The system may use at least a plurality of physical transfer apparatuses and a plurality of alimentary combination identifiers, each with an associated element of data that refers to a geolocation destination.

Physical transfer apparatus geolocation data may be sampled and collected periodically. In non-limiting illustrative examples, physical transfer apparatus locations may be sampled every 1 minute to determine interchange nodes, wherein the data is collected as a function of the physical transfer apparatus location changes over time since a previous sampling. Physical transfer apparatus locations may be collected via a physical transfer apparatus's GPS, web mapping service, or the like. Alternatively or additionally, a physical transfer apparatus may contain a device that relays its location to a computing device for determining an interchange node, for instance and without limitation, a GPS tracking device.

Continuing in reference to FIG. 1, computing device 104 may select an interchange node for a plurality of physical transfer apparatuses. An "interchange node," as used in this disclosure refers to a centralized geolocation that can become a distribution center for items, parcels, alimentary combination identifiers, packages, or the like, can be exchanged, loaded, swapped, or otherwise doled out to physical transfer apparatuses. For instance and without limitation, interchange nodes may be parking lots, fuel stations, parks, convenience stores, or the like, that may accommodate delivery drivers to take on alimentary combination identifiers for delivery.

Continuing in reference to FIG. 1, computing device 104 selecting an interchange node may generate candidate interchange nodes 116, wherein generating candidate interchange nodes 116 may include using an interchange node machine-learning process 120 to generate candidate interchange nodes 116, wherein each candidate location includes a location and a node time, for a plurality of physical transfer apparatuses based on alimentary combination identifier terminal points and current physical transfer apparatus locations, as described in further detail below.

Figure 2:
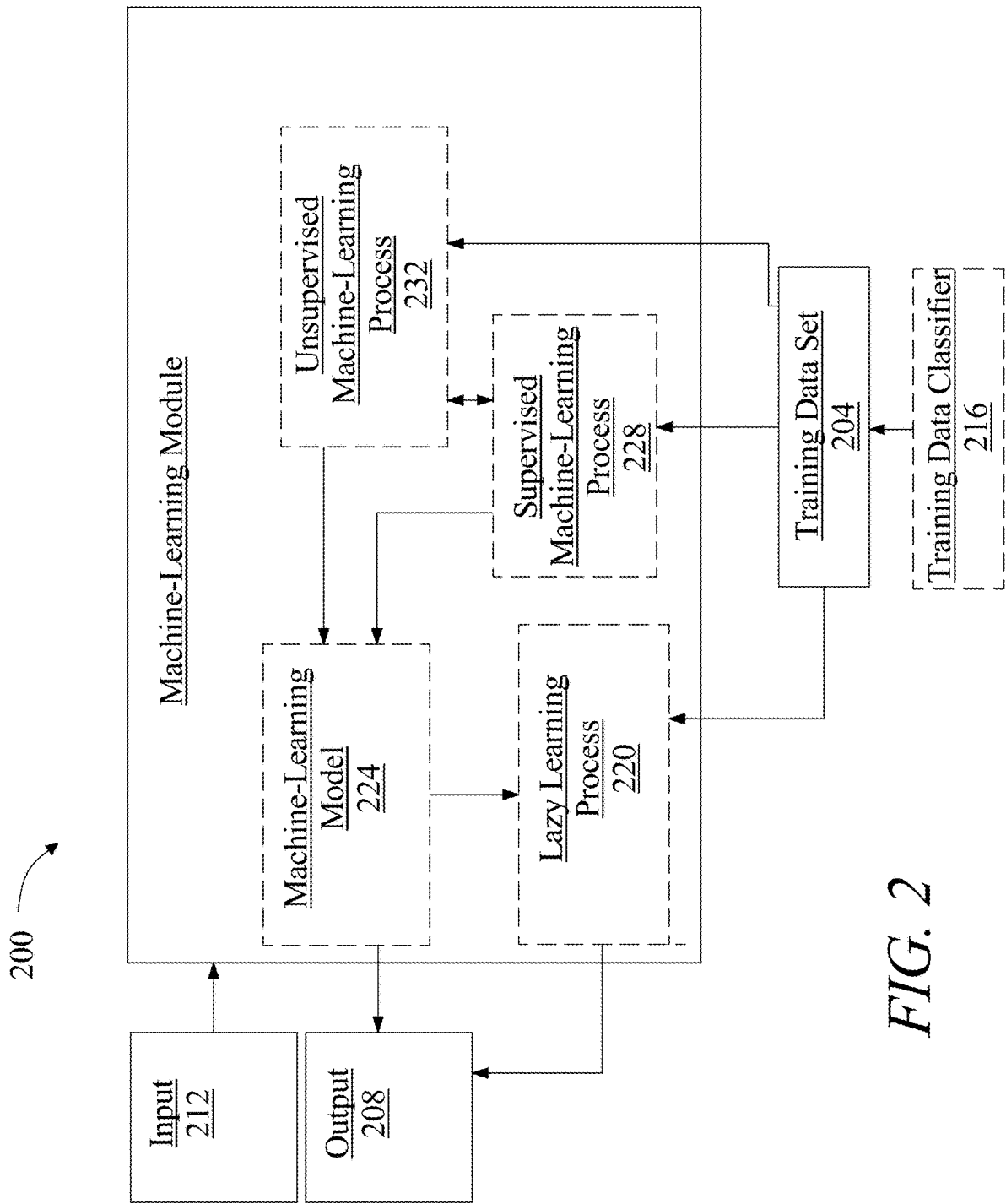
FIG. 2 is a block diagram illustrating an exemplary embodiment of a machine-learning module.

Referring now to FIG. 2, an exemplary embodiment of a machine-learning module 200 that may perform one or more machine-learning processes as described in this disclosure is illustrated. Machine-learning module 200 may include any suitable machine-learning module which may perform determinations, classification, and/or analysis steps, methods, processes, and the like as described in this disclosure using machine learning processes, such as an interchange node machine-learning process 102. A "machine learning process," as used in this disclosure, is a process that automatedly uses training data set 204 containing training data to generate an algorithm that will be performed by a computing device/module to produce outputs 208 given data provided as inputs 212; this is in contrast to a non-machine learning software program where the commands to be executed are determined in advance by a user and written in a programming language.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, and the like. Machine-learning module 200 may generate a classifier using a classification algorithm, defined as a process whereby a computing device and/or any module and/or component operating thereon derives a classifier from training data set 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to match one or more categories including elements of user data and/or constitutional data, such as without limitation a cohort of persons and/or other analyzed items and/or phenomena for which a subset of training data may be selected.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data set 204. Heuristic may include selecting some number of highest-ranking associations and/or training data set 204 elements. Lazy learning may implement any suitable lazy learning algorithm, including without limitation a K-nearest neighbors algorithm, a lazy naïve Bayes algorithm, and the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data set 204 are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as "deep learning".

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include selected candidate interchange nodes 116 as inputs, selected interchange nodes as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data set 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, and the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus a term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 2, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data set 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data set 204.

Referring back to FIG. 1, computing device 104 may generate candidate interchange nodes 116 using an interchange node machine-learning process 116, wherein the interchange node machine-learning process 120 may generate the plurality of candidate locations as a function of a Monte Carlo simulation 124. The interchange node machine-learning process 120 may perform a Monte Carlo simulation wherein the machine-learning process may accept an input of the current physical transfer apparatus locations and the order destination geolocations, and sample the geographical landscape for points that the physical transfer apparatuses may converge as a centralized location, and generate an output that is a candidate location for this centralized location. For each location the interchange node machine-learning process 120 may calculate the average time for the plurality of physical transfer apparatuses to reach the candidate interchange node. Calculating the average time to reach the candidate interchange node may include tracing a path from the current physical transfer apparatus location to the candidate interchange node and estimating the time of traveling the path, taking into consideration speed limits, traffic flow, weather conditions, and the like.

Continuing in reference to FIG. 1, a "Monte Carlo simulation" may refer to a "Monte Carlo method," "Monte Carlo experiment," and/or performing a "Monte Carlo algorithm." A Monte Carlo simulation is a mathematical technique that may generate variables, numerical values, and the like, for modeling risk, uncertainty, etc. of a certain system using a stochastic simulation process. Monte Carlo simulations may encompass a range of algorithms and mathematical analysis techniques such as Markov Model Monte Carlo (MMMC) simulations, McKean-Vlasov processes, Monte Carlo localization, among other probabilistic heuristics. As used herein, a Monte Carlo simulation may generate random locations, wherein each location may represent a sufficiently good solution to an optimization problem, wherein the solution is a location represented by a 2D polar coordinate, vector, or the like, that represents a position in space in a geographical information system (GIS), such as a map. Each generated geolocation may have associated with it a distance from a plurality of physical transfer apparatuses. And thus, each location may have an estimated time of travel for each of the plurality of physical transfer apparatuses to reach a randomly generate location. Each geolocation can then have associated with it an "average time" variable, wherein the average time is a numerical value that represents the time of travel for a plurality of physical transfer apparatuses to reach the geolocation. Geolocations can be plotted and/or mapped as a function of their times and a machine-learning process may select geolocations based on some criterion, for instance the geolocations with the most minimized average times and select those geolocations as inputs to subsequent calculations.

A Monte Carlo simulation is a class of computation algorithms used by a machine-learning process that may rely on repeated random sampling to obtain numerical results, for instance generating random spatial locations within a confined space on a map. Monte Carlo simulations may be performed with dynamic systems that may be coupled with an analysis method, for instance an unknown spatial location relative to moving physical transfer apparatuses, wherein the movement is determine by sampling within the simulation. In non-limiting illustrative examples, a machine-learning process, such as a supervised machine-learning process, may accept generated candidate locations from a Monte Carlo simulation, as described above, and calculate predicted paths to the candidate locations from the current physical transfer apparatus locations, wherein the predicted paths may contain numerical results from the simulated locations. The Monte Carlo simulation may generate many candidate locations, where a machine-learning process may narrow the number of locations based on relative distance and/or time of travel from a plurality of physical transfer apparatuses. Such a machine-learning process may iteratively generate selected locations based on a criterion, for instance and without limitation, minimized travel time for a plurality of physical transfer apparatuses, wherein when it is time for a candidate location to be used for purposes of handing off alimentary combination identifiers, a machine-learning process may retrieve a selected interchange node.

Continuing in reference to FIG. 1, computing device 104 selecting the candidate interchange node 116 may calculate using the candidate interchange nodes 116 and the interchange node machine-learning process 120, a transfer path time 128 for each physical transfer apparatus of the plurality of physical transfer apparatuses to reach each candidate interchange node 116. Calculating each physical transfer apparatus path time may include determining a physical transfer apparatus path from the physical transfer apparatus current geolocation to the geographical location of the candidate interchange node, and then calculating the time for the path to be traveled from current physical transfer apparatus location to the candidate interchange node. A "path," as used in this disclosure, refers to a route mapped by GPS coordinates, GIS coordinates, or any other suitable geographic directional information for guiding a physical transfer apparatus along a map, web-based map, or any other suitable electronic mapping application, about a calculated route. In non-limiting illustrative examples, a path may refer to a directional route mapped on a web-based, electronic map application, wherein the route contains graphical directional information and instructions detailing the maneuvers necessary to complete the route.

Figure 3:
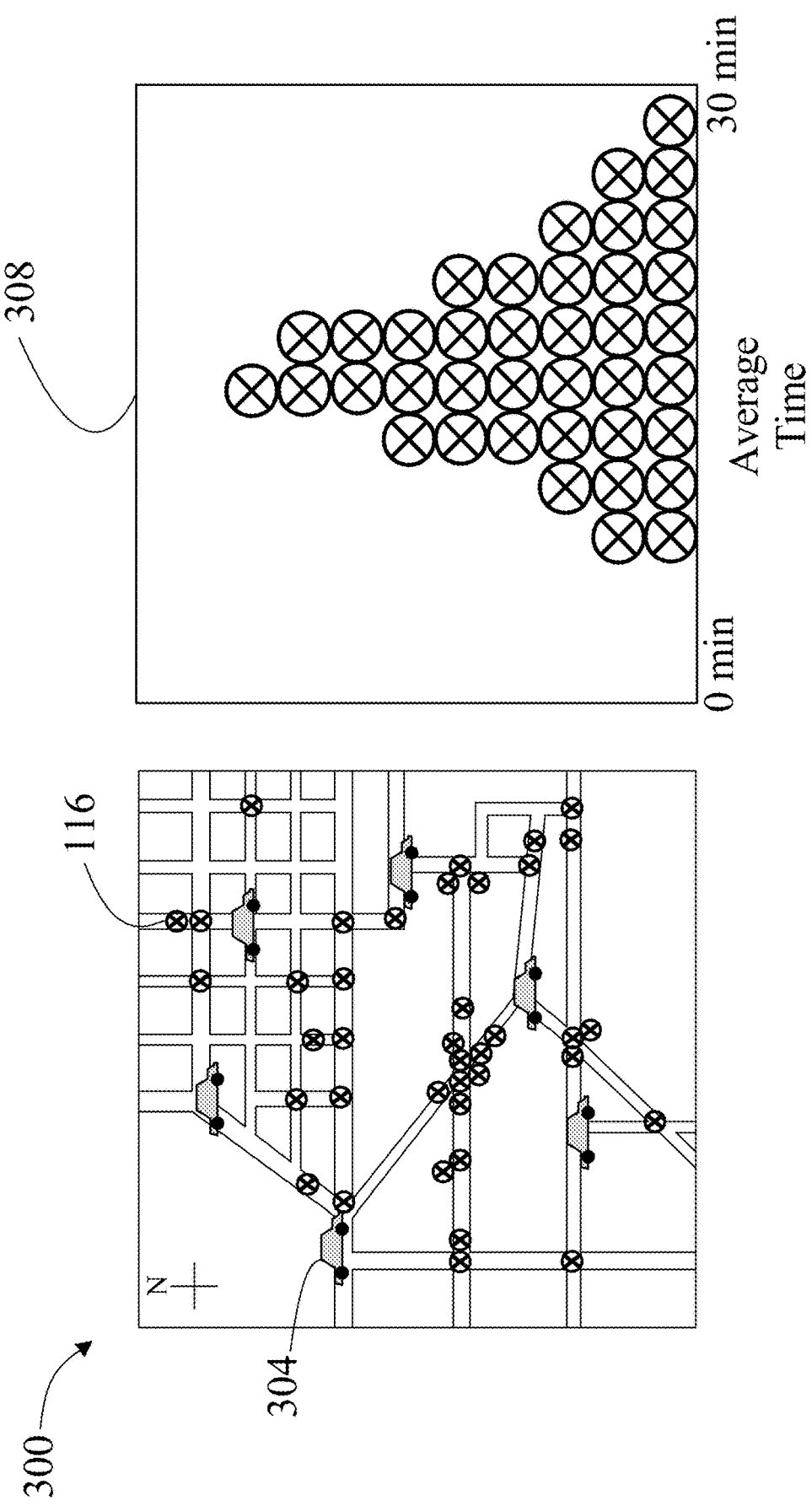
FIG. 3 is a diagrammatic representation of an exemplary embodiment of generation of candidate interchange nodes.

Referring now to FIG. 3, an exemplary embodiment 300 of a Monte Carlo simulation generating randomly selected locations on a local map, is illustrated. The left panel shows locations of physical transfer apparatuses 304 (6 total). Monte Carlo simulation locations denoted by circles on the left panel are graphed in a path histogram 308 (right panel) as a function of the average time of travel of physical transfer apparatuses 304 along the shortest paths to the candidate interchange nodes 116. An interchange node machine-learning model 120 may guide the Monte Carlo simulation, for instance and without limitation, by guiding the simulation by applying a search radius on the map around locations that represent local minima in the average time.

Figure 4:
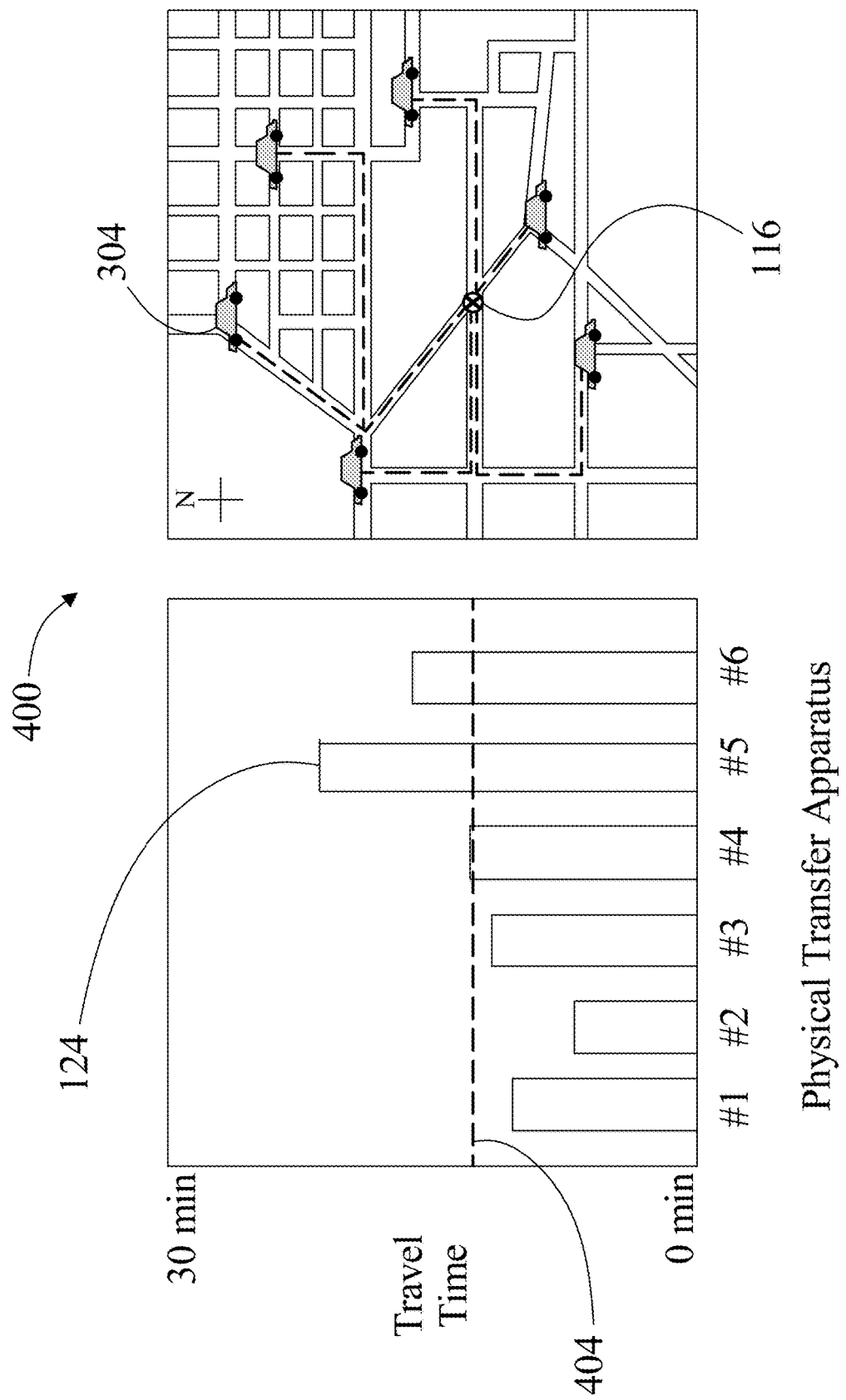
FIG. 4 is a diagrammatic representation of an exemplary embodiment of a selected interchange node and transfer paths.

Referring now to FIG. 4, an exemplary embodiment 400 of calculated transfer path times and paths for a plurality of transfer apparatuses 304 for a selected candidate interchange node 116, is illustrated. For each Monte Carlo simulated location, an interchange node machine-learning model 120 may determine the shortest path to each of a plurality of transfer apparatuses and calculate the time of travel. An interchange node machine-learning process 120 may accomplish this by conventional means using a mapping application; persons skilled in the art upon reviewing of this disclosure in its entirety will be aware of the various ways in which a machine-learning process may calculate travel times for paths traced on a map by using various map applications. The interchange node machine-learning process 120 may then calculate the transfer path time 128 for the plurality of physical transfer apparatuses 304 and determine which candidate interchange node 116 generated from the Monte Carlo simulation results in the location that minimizes travel time. Such a calculation may determine the average transfer path time 404 of the transfer path times of the plurality of physical transfer apparatuses 304. In non-limiting illustrative examples, an interchange node machine-learning process 120 may train a machine-learning model as a function of the calculated path times and the Monte Carlo simulation outputs to constrain or otherwise restrict the Monte Carlo sampling to a localized area of a map. In such an example, an interchange node machine-learning process 120 may calculate centralized location travel times and feed the results as training data into a machine-learning model which may describe a trend, function, or model of minimized travel times has been observed as a trend in the calculations.

Referring now to FIG. 1, computing device 104 may select the candidate interchange node 116 that minimizes the transfer time for each the plurality of physical transfer apparatuses. Computing device 104 may select the candidate interchange node 116 based on the calculated paths generated by the handoff machine-learning process 120, resulting in a selected interchange node 132. Selection of the candidate interchange node 116 may include selecting the candidate interchange node 116 that minimizes the transfer time for each of the plurality of physical transfer apparatuses, for instance and without limitation that minimizes the average transfer time for the plurality of physical transfer apparatuses. Alternatively or additionally, minimizing the transfer time may include a first physical transfer apparatus meeting with a second physical transfer apparatus, and the second meeting with a plurality of transfer apparatuses. In non-limiting illustrative examples, the plurality of physical transfer apparatuses may meet at more than one candidate interchange node 116, wherein the selection is based on more than one handoff event.

Selection of the selected interchange node 132 may include selection of a transfer path 136 for at least one physical transfer apparatus of the plurality of physical transfer apparatuses in reaching the selected interchange node. The transfer path 136 that was calculated by an interchange node machine-learning process 120 associated with the selected interchange node 132 may be stored alongside the location and identity of the selected interchange node 132. Such a transfer path 136 may be stored and/or retrieved from a location database 140.

Figure 5:
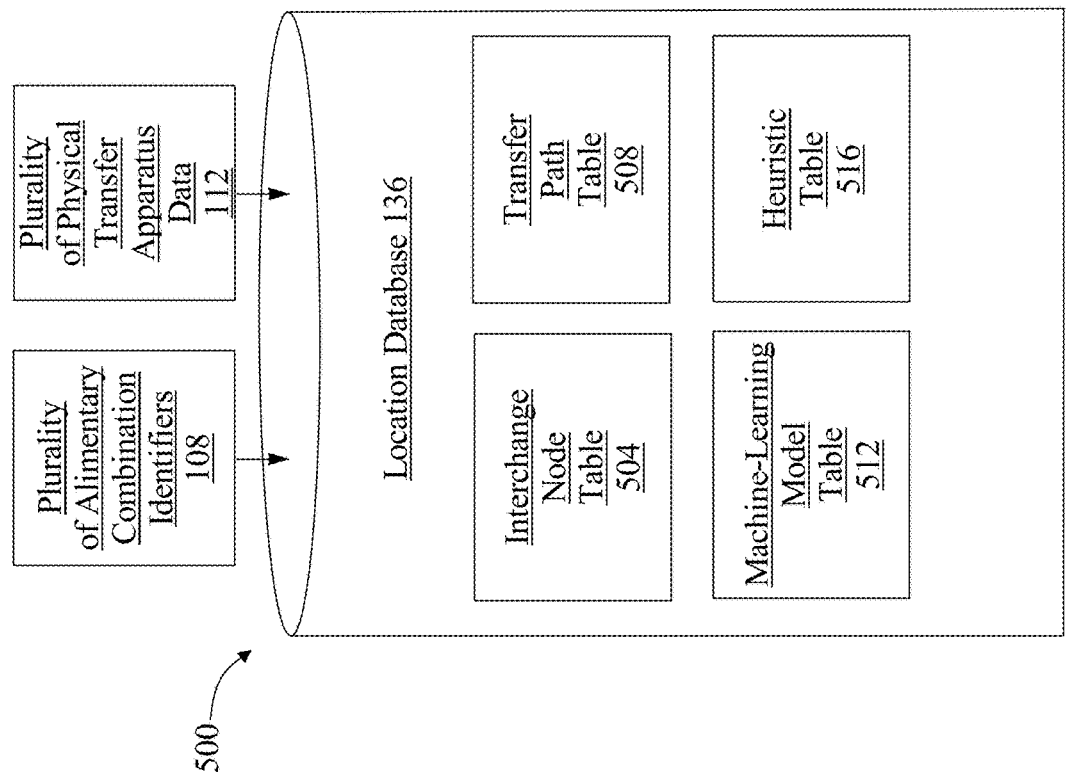
FIG. 5 is a block diagram illustrating an exemplary embodiment of a location database.

Referring now to FIG. 5, a non-limiting exemplary embodiment 500 of a location database 140 is illustrated. Location database 140 may be implemented, without limitation, as a relational database, a key-value retrieval database such as a NOSQL database, or any other format or structure for use as a database that a person skilled in the art would recognize as suitable upon review of the entirety of this disclosure. Location database 140 may alternatively or additionally be implemented using a distributed data storage protocol and/or data structure, such as a distributed hash table and the like. Location database 140 may include a plurality of data entries and/or records, as described above. Data entries in a location database 140 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Further referring to FIG. 5, location database 140 may include, without limitation, an interchange node table 504, transfer path table 508, machine-learning model table 512, heuristic table 516. Determinations by a machine-learning process, machine-learning model, scoring function, mapping algorithm, and/or objective function may also be stored and/or retrieved from the location database 140, for instance in non-limiting examples a classifier describing a plurality of transfer paths 136 as it relates to a selected interchange node 132. Determinations by a machine-learning model for selecting a region for a candidate interchange node 116 and/or a rankings of interchange nodes based on geolocation may also be stored and/or retrieved from the location database 140. As a non-limiting example, location database 140 may organize data according to one or more instruction tables. One or more location database 140 tables may be linked to one another by, for instance in a non-limiting example, common column values. For instance, a common column between two tables of location database 140 may include an identifier of a submission, such as a form entry, textual submission, global position system (GPS) coordinates, addresses, and the like, for instance as defined below; as a result, a query may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables.

Still referring to FIG. 5, in a non-limiting embodiment, one or more tables of a location database 140 may include, as a non-limiting example, an interchange node table 504, which may include geolocations, GPS coordinates, addresses, or the like, generated by a Monte Carlo simulation 124, interchange node machine-learning process 120, and/or any associated data relating to an order en route to an interchange node, including when the order was placed, the identity of the alimentary elements in said order, and/or linked to other data such as the order destination geolocation data for an alimentary element, for use in determining order delivery combinations, and/or other elements of data computing device 104 and/or system 100 may store, retrieve, and use to determine usefulness and/or relevance of data in determining selected interchange nodes 132, transfer paths 136, and the like, as described in this disclosure. One or more tables may include transfer path table 508, which may include a history of numerical values, GPS coordinates, addresses, timestamps, and the like, for instance and without limitation, that represent transfer paths 136 determined for physical transfer apparatuses in determining travel time. One or more tables may include a machine-learning table 512, which may store and/or organize rankings, scores, models, outcomes, functions, numerical values, vectors, matrices, and other determinations by the interchange node machine-learning model 120 in refining the Monte Carlo simulation in generating candidate interchange nodes. One or more tables may include, without limitation, a heuristic table 516, which may include one or more inputs describing potential mathematical relationships between at least an element of user data and, for instance and without limitation, batching instructions, and rankings thereof, and/or predicted paths and how they may change as a function of reaching particle areas of a map, as described in further detail below.

Figure 6:
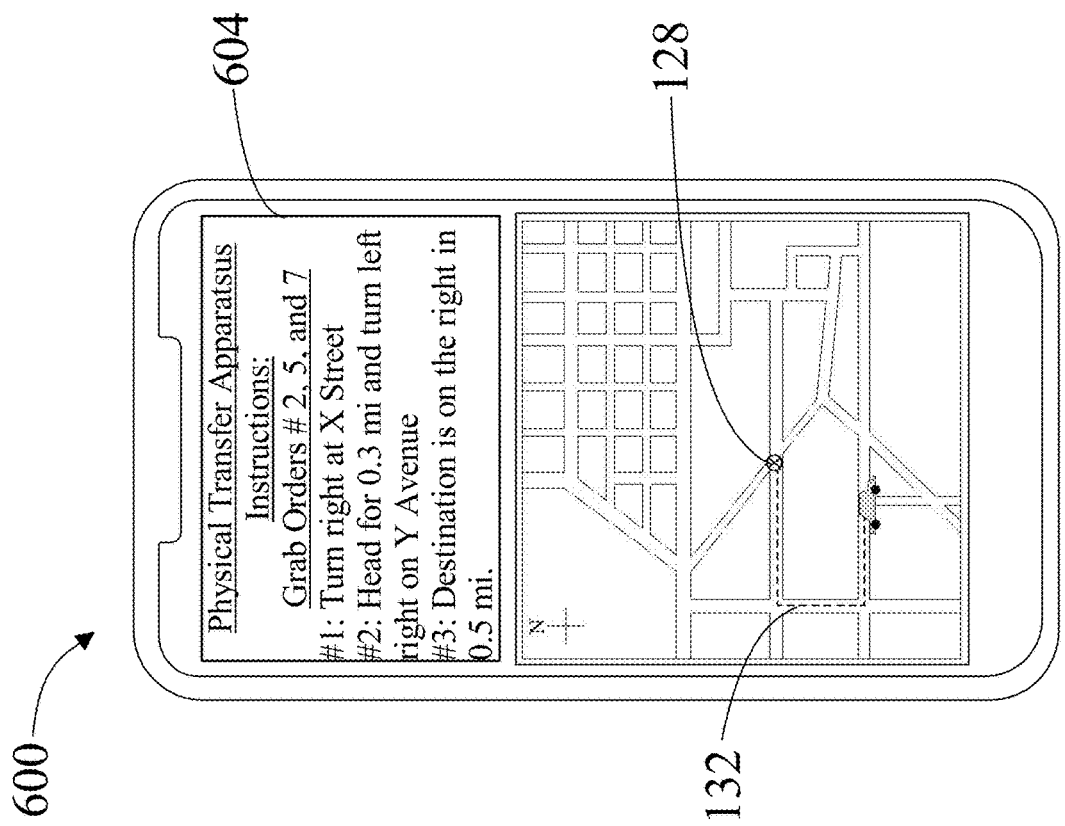
FIG. 6 is a diagrammatic representation of an exemplary embodiment of a graphical display of a selected interchange node to a user device.

Referring now to FIG. 6, computing device 104 displaying the selected interchange node 132 to a plurality of physical transfer apparatuses using a user device 600 is illustrated. Displaying the selected interchange node 132 may include displaying a path associated with the selected interchange node. User device 600 may display the calculated transfer path 136 associated with the physical transfer apparatus for which the interchange node travel time was calculated. Displaying may be done using a graphical user interface (GUI) or any other suitable user interface for displaying graphics, text, and the like. Persons skilled in the art, upon reviewing the entirety of this disclosure, will be aware of various ways in which interchange nodes and transfer paths may be displayed via a user device and what devices may be used as a user device.

Continuing in reference to FIG. 6, computing device 104 displaying the selected interchange node 132 to the plurality of physical transfer apparatuses may include displaying the alimentary combination identifiers assigned to each physical transfer apparatus. Displaying the alimentary combination identifiers may include an order display 604 wherein each physical transfer apparatus of the plurality of transfer apparatuses may be provided instructions corresponding to which alimentary combination identifiers are to be received at the selected interchange node 132. This may be done to increase efficiency in that not all physical transfer apparatuses reach a selected interchange node 132 at the same time.

Referring back to FIG. 1, computing device 104 may store candidate interchange nodes 116 in a location database 140 for further use as subsequent interchange nodes 116. Alternatively or additionally, an interchange node machine-learning process 120 may use a candidate interchange node 116 and/or selected interchange node 132 for use in training machine-learning models in applying to Monte Carlo simulations, may use as localized maps for Monte Carlo simulations to narrow location generation, and the like. An interchange node machine-learning process 120 may select transfer paths 136 associated with past candidate interchange nodes 116 to store as future paths for physical transfer apparatuses.

Figure 7:
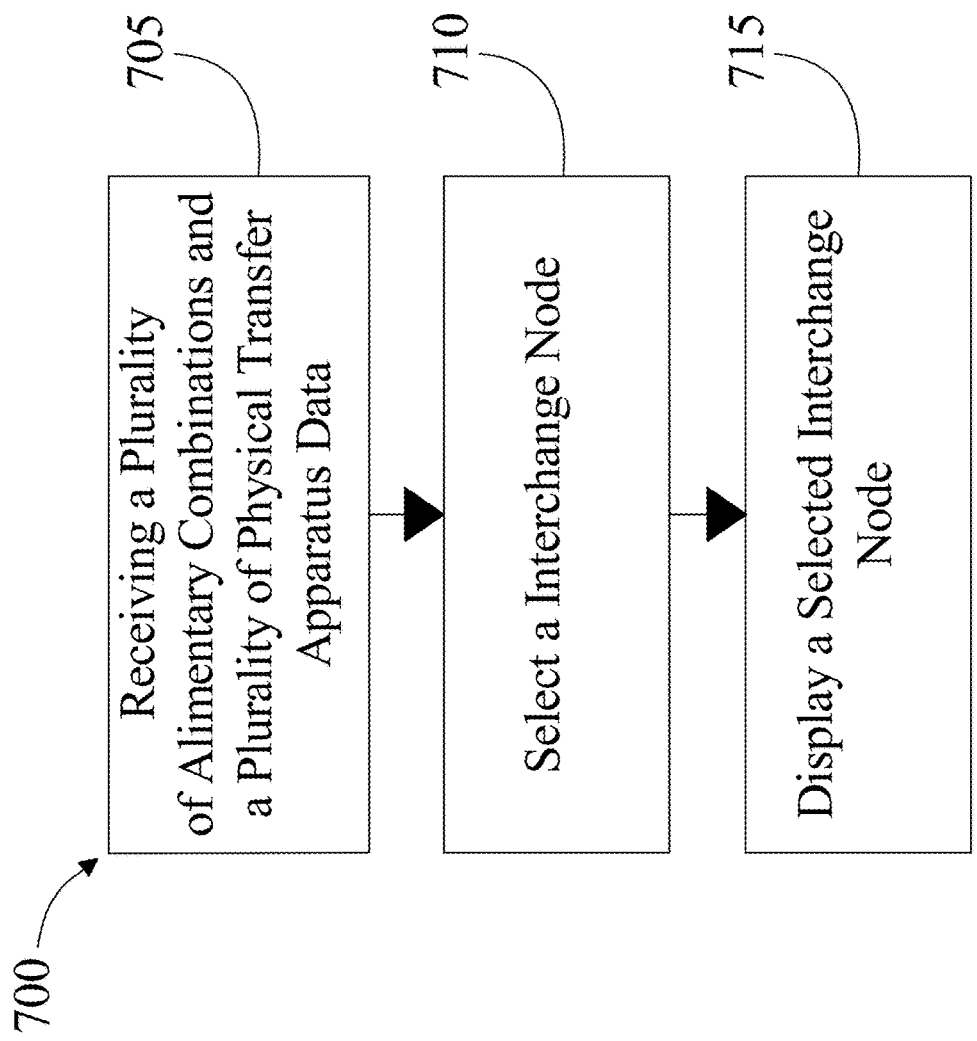
FIG. 7 is a flow diagram illustrating an exemplary method for determining physical transfer interchange nodes.

Referring now to FIG. 7, an exemplary embodiment of a method 700 for determining physical transfer interchange nodes is illustrated. At step 705, computing device may receive a plurality of alimentary combination identifiers and a plurality of physical transfer apparatus data. The plurality of alimentary combination identifiers further comprises the identity of the plurality of alimentary elements of the plurality of alimentary combination identifiers and the destination geolocation of the plurality of alimentary combination identifiers. The plurality of physical transfer apparatus data further comprises physical transfer apparatus location data; this may be implemented, without limitation, as described above in reference to FIGS. 1-6.

At step 710, computing device 104 may select an interchange node for a plurality of physical transfer apparatuses to obtain a plurality of alimentary combination identifiers, wherein selecting further comprises generating candidate interchange nodes, wherein generating candidate interchange nodes further comprises using an interchange node machine-learning process to generate candidate interchange nodes, each candidate location including a geographic location and a handoff time, for a plurality of physical transfer apparatuses to obtain a plurality of alimentary combination identifiers based on order destinations and current physical transfer apparatus locations, calculating, using the candidate interchange nodes and the interchange node machine-learning process, a transfer path time for each physical transfer apparatus of the plurality of physical transfer apparatuses to reach each candidate interchange node, and selecting a candidate interchange node that minimizes the transfer time for each the plurality of physical transfer apparatuses. Generating candidate interchange nodes further comprises generating the plurality of candidate locations as a function of a Monte Carlo simulation. Calculating each the transfer path time further comprises determining a physical transfer apparatus path from the physical transfer apparatus current geolocation to the geographical location of the candidate interchange node and calculating the time for a path from current physical transfer apparatus location to the candidate interchange node. Selecting the candidate interchange node further comprises selecting a transfer path for at least one of the plurality of physical transfer apparatuses to reach the selected interchange node; this may be implemented, without limitation, as described above in reference to FIGS. 1-6.

At step 715, computing device 104 may display the selected interchange node to a plurality of physical transfer apparatuses. Displaying the selected interchange node further comprises displaying a path associated with the selected interchange node. Displaying the selected interchange node to the plurality of physical transfer apparatuses further comprises displaying the alimentary combination identifiers assigned to each physical transfer apparatus. Candidate interchange nodes are stored in a database for further use as subsequent interchange nodes; this may be implemented, without limitation, as described above in reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
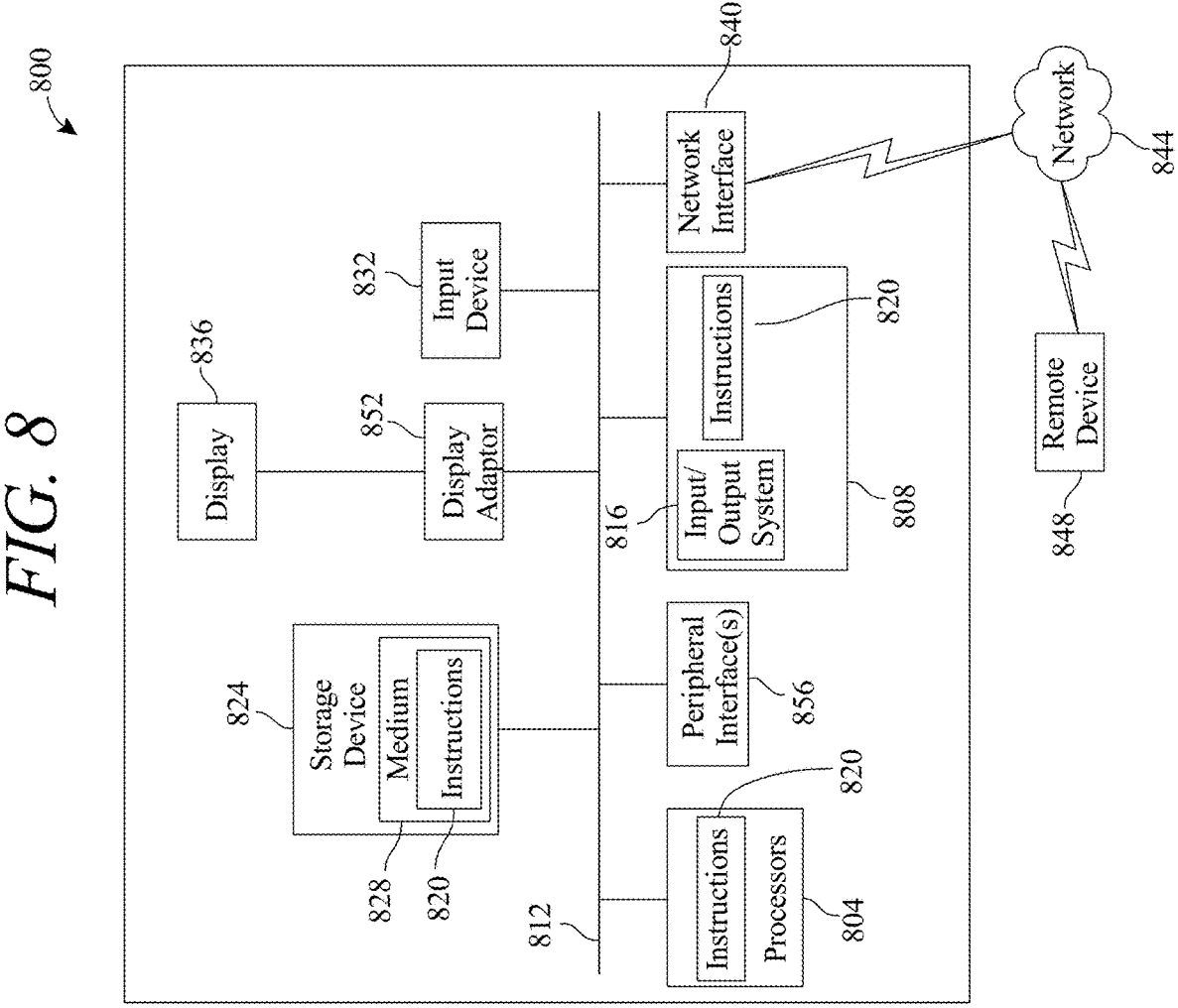
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for determining physical transfer interchange nodes using machine-learning simulation, the system comprising:
 a computing device, the computing device is configured to:
 receive a plurality of alimentary combination identifiers and a plurality of physical transfer apparatus data;
 select an interchange node for a plurality of physical transfer apparatuses, wherein the selecting further comprises:
  generating an interchange node machine-learning model, wherein interchange node machine-learning model comprises a Monte Carlo Simulation configured to utilize a plurality of alimentary combination identifier terminal points and a current physical transfer apparatus location and at least an order destination geolocation as inputs and output a plurality of candidate interchange nodes by sampling a geographical landscape for points that at least the physical transfer apparatus may converge as a centralized location, wherein the plurality of candidate interchange nodes includes a candidate location for the centralized location and a node time for a plurality of physical transfer apparatuses, wherein generating the interchange node machine-learning model comprises:
   providing a training set including a plurality of entries correlating alimentary combination identifier terminal points and current physical transfer apparatus locations to candidate interchange nodes describing at least a trend, function, or model of minimized travel times, wherein the interchange node comprises a centralized geolocation further comprising a distribution center; and
   training the interchange node machine-learning model as a function of the set and a supervised machine-learning algorithm; and
  calculating, as a function of the plurality of candidate interchange nodes and the interchange node machine-learning model, a transfer path time for each physical transfer apparatus of the plurality of physical transfer apparatuses to each candidate interchange node wherein calculating average time to the candidate interchange node further comprises tracing a path from the current physical transfer apparatus location to the candidate interchange node; and
  selecting a candidate interchange node that minimizes the transfer path time for each of the plurality of physical transfer apparatuses; and
 display the selected interchange node and the associated alimentary combination identifiers including corresponding receiving instructions to the plurality of physical transfer apparatuses.

2. The system of claim 1, wherein each alimentary combination identifier of the plurality of alimentary combination identifiers further comprises an identifier of an alimentary combination and a terminal point location.

3. The system of claim 1, wherein the plurality of physical transfer apparatus data further comprises physical transfer apparatus location data.

4. The system of claim 1, wherein calculating each the transfer path time further comprises:
 determining a physical transfer apparatus path from the physical transfer apparatus current location to the location of the candidate interchange node; and
 calculating a time for a path from current physical transfer apparatus location to the candidate interchange node.

5. The system of claim 1, wherein selecting the candidate interchange node further comprises selecting a transfer path for at least one of the plurality of physical transfer apparatuses to the selected interchange node.

6. The system of claim 1, wherein displaying the selected interchange node further comprises displaying a path associated with the selected interchange node.

7. The system of claim 1, wherein displaying the selected interchange node to the plurality of physical transfer apparatuses further comprises displaying the alimentary combination identifiers assigned to each physical transfer apparatus.

8. The system of claim 7, wherein displaying alimentary combination identifiers assigned to each physical transfer apparatus further comprises displaying a transfer path associated with the alimentary combination locations.

9. The system of claim 1, wherein candidate interchange nodes are stored for further use as subsequent interchange nodes.

10. A method for determining physical transfer interchange nodes using machine-learning simulation, the method comprising:
 receiving, by a computing device, a plurality of alimentary combination identifiers and a plurality of physical transfer apparatus data;
 selecting, by the computing device, an interchange node for a plurality of physical transfer apparatuses, wherein the selecting further comprises:
  generating an interchange node machine-learning model, wherein interchange node machine-learning model comprises a Monte Carlo Simulation configured to utilize a plurality of alimentary combination identifier terminal points and a current physical transfer apparatus location and at least an order destination geolocation as inputs and output a plurality of candidate interchange nodes by sampling a geographical landscape for points that at least the physical transfer apparatus may converge as a centralized location comprising a centralized geolocation, wherein the plurality of candidate interchange nodes includes a candidate location for the centralized location and a node time for a plurality of physical transfer apparatuses, wherein generating the interchange node machine-learning model comprises:
   providing a training set including a plurality of entries correlating alimentary combination identifier terminal points and current physical transfer apparatus locations to candidate interchange nodes describing at least a trend, function, or model of minimized travel times, wherein the interchange node comprises a centralized geolocation further comprising a distribution center; and
   training the interchange node machine-learning model as a function of the set and a supervised machine-learning algorithm; and calculating, as a function of the plurality of candidate interchange nodes and the interchange node machine-learning model, a transfer path time for each physical transfer apparatus of the plurality of physical transfer apparatuses to each candidate interchange node wherein calculating average time to the candidate interchange node further comprises tracing a path from the current physical transfer apparatus location to the candidate interchange node; and selecting a candidate interchange node that minimizes the transfer path time for each of the plurality of physical transfer apparatuses; and display the selected interchange node and the associated alimentary combination identifiers including corresponding receiving instructions to a plurality of physical transfer apparatuses.

11. The method of claim 10, wherein each alimentary combination identifier of the plurality of alimentary combination identifiers further comprises an identifier of an alimentary combination and a terminal point location.

12. The method of claim 10, wherein the plurality of physical transfer apparatus data further comprises physical transfer apparatus location data.

13. The method of claim 10, wherein calculating each the transfer path time further comprises:

determining a physical transfer apparatus path from the physical transfer apparatus current location to the location of the candidate interchange node; and calculating the time for a path from current physical transfer apparatus location to the candidate interchange node.

14. The method of claim 10, wherein selecting the candidate interchange node further comprises selecting a transfer path for at least one of the plurality of physical transfer apparatuses to the selected interchange node.

15. The method of claim 10, wherein displaying the selected interchange node further comprises displaying a path associated with the selected interchange node.

16. The method of claim 10, wherein displaying the selected interchange node to the plurality of physical transfer apparatuses further comprises displaying the alimentary combination identifiers assigned to each physical transfer apparatus.

17. The method of claim 16, wherein displaying alimentary combination identifiers assigned to each physical transfer apparatus further comprises displaying a transfer path associated with the alimentary combination locations.

18. The method of claim 10, wherein candidate interchange nodes are stored for further use as subsequent interchange nodes.

* * * * *